United States Patent
Inage

(10) Patent No.: US 8,159,726 B2
(45) Date of Patent: Apr. 17, 2012

(54) IMAGE READER, IMAGE PROCESSOR, AND COMPUTER PROGRAM PRODUCT

(75) Inventor: Osamu Inage, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1189 days.

(21) Appl. No.: 11/715,945

(22) Filed: Mar. 9, 2007

(65) Prior Publication Data

US 2007/0216962 A1    Sep. 20, 2007

(30) Foreign Application Priority Data

Mar. 17, 2006    (JP) .................. 2006-075019

(51) Int. Cl.
*H04N 1/23*    (2006.01)

(52) U.S. Cl. ........ 358/474; 358/406; 358/496; 358/498; 358/504; 358/505; 382/274

(58) Field of Classification Search .............. 358/406, 358/474, 496, 498, 461, 505, 504; 382/274
See application file for complete search history.

(56) References Cited

U.S. PATENT DOCUMENTS

| | | | |
|---|---|---|---|
| 4,918,489 A | 4/1990 | Inage et al. | |
| 5,350,900 A | 9/1994 | Inage et al. | |
| 5,864,408 A * | 1/1999 | Kumashiro | 358/461 |
| 6,198,349 B1 | 3/2001 | Kanno et al. | |
| 6,426,804 B1 | 7/2002 | Kanno et al. | |
| 6,611,360 B1 | 8/2003 | Kataoka | |
| 6,641,040 B2 | 11/2003 | Inage | |
| 6,657,748 B1 | 12/2003 | Okita et al. | |
| 6,867,885 B2 | 3/2005 | Inage | |
| 2003/0072497 A1 * | 4/2003 | Hiromatsu | 382/274 |
| 2004/0057087 A1 * | 3/2004 | Wada | 358/497 |
| 2006/0023267 A1 * | 2/2006 | Ikeno et al. | 358/474 |
| 2006/0126125 A1 * | 6/2006 | Matsuda et al. | 358/461 |
| 2007/0013954 A1 | 1/2007 | Soeda et al. | |

FOREIGN PATENT DOCUMENTS

| | | |
|---|---|---|
| EP | 0 286 414 | 10/1988 |
| EP | 1 037 456 | 9/2000 |
| EP | 1 261 193 | 11/2002 |
| JP | 10-136160 | 5/1998 |
| JP | 2000-78353 | 3/2000 |
| JP | 2002-247312 | 8/2002 |
| JP | 2002-344708 | 11/2002 |
| JP | 2006-14214 | 1/2006 |

OTHER PUBLICATIONS

European Search Report dated Jun. 5, 2009.
Japanese Office Action mailed Jul. 13, 2010.
European Search Report issued in corresponding application.

\* cited by examiner

*Primary Examiner* — James A Thompson
*Assistant Examiner* — Kent Yip
(74) *Attorney, Agent, or Firm* — Harness, Dickey & Pierce, P.L.C.

(57) ABSTRACT

An image processor includes a reading unit that moves a scanning optical system toward a reference white sheet to read the reference white sheet from a direction along which the scanning optical system returns to the carried document reading glass before reading one sheet of a document mounted on a carried document reading glass by an automatic document feeding unit in a sheet document reading mode of forming an image of the document carried by the automatic document feeding unit by an image sensor through the scanning optical system facing the carried document reading glass.

19 Claims, 19 Drawing Sheets

IMAGE READER, IMAGE PROCESSOR, AND COMPUTER PROGRAM PRODUCT

CROSS-REFERENCE TO RELATED APPLICATION

The present document incorporates by reference the entire contents of Japanese priority document, 2006-075019 filed in Japan on Mar. 17, 2006.

BACKGROUND OF THE INVENTION

1. Field of the Invention

The present invention relates to an image reader, an image processor, and a computer program product.

2. Description of the Related Art

In a conventional image reader, when shading correction of eliminating irregularities in a lamp light amount distribution is carried out every time (i.e., reference white sheet data is also collected once every time each single sheet of an original document) is read in a continuous reading operation in a document feeder (DF) reading mode, reciprocation is performed between a reference white sheet and a DF reading position, which unnecessarily takes time. Therefore, the conventional image reader has a problem of a reduction in productivity.

Further, in the continuous reading operation in the DF reading mode by the conventional image reader, the following problem also occurs.

As shown in FIG. 18, when a color CCD (e.g., an RGB three-line CCD) fetches an image, a reference white sheet 101 is read while moving a carriage 100 in a forward direction (a document carrying direction) (it is assumed that data is fetched in the order of R, G, and B at the time). Since an original document 200 carried in the DF reading mode is carried with respect to the carriage 100 moved in a return direction (an opposite direction of the document carrying direction), data on the original document is read in the order of B, G, and R (this is opposite to the order of reading the reference white sheet 101). Furthermore, RGB data read by the color CCD is generally subjected to "interlinear correction" of increasing a delay amount of data read earlier to match positions of R, G, and B. That is, when the reading order of the RGB data in reading the reference white sheet 101 and the original document 200 is opposite, the order of data to be delayed by "interlinear correction" must be reversed. Therefore, a load is further increased with respect to a period where a CPU load is already large, thereby inhibiting an improvement in productivity.

Thus, Japanese Patent Application Laid-open No. 2002-247312 discloses a document reader that changes a time interval in intermittent shading according to a required image quality to improve productivity. Generally, reference white sheet data is collected just once every predetermined sheet of an original document, and an interval in the collecting operation varies depending on a required image quality, e.g., that in a photograph mode or a character mode.

Moreover, Japanese Patent Application Laid-open No. 2002-344708 discloses an image reader and an image former that move a carriage to a reference white sheet at a high velocity and read the reference white sheet during a reduction in speed, precipitously decrease a velocity of the carriage to shorten a time until return after reading, and slowly move the carriage in the return operation so as to facilitate convergence of vibrations of an optical system in a document reading operation. As a result, productivity of a continuous reading operation in the DF reading mode can be improved, and stable reference white sheet data can be collected.

However, according to the document reader disclosed in Japanese Patent Application Laid-open No. 2002-247312, an interval between collection of reference white sheet data, and subsequent collection of the same is set based on an elapsed time from lighting or a variation in a temperature, but a lamp (xenon lamp) has temperature characteristics. Therefore, an inconvenience may possibly occur. That is, a variation in luminescent characteristics differs depending on a situation where the lamp is turned on when it is warmed and a situation where the lamp is turned on when it is still cold. When a margin is given with respect to a variation in luminescent characteristics, productivity is sacrificed. When a margin is reduced, an image defect may occur.

Additionally, according to the image reader and the image former disclosed in Japanese Patent Application laid-open No. 2002-344708, when continuously reading many sheets of an original document in the DF reading mode, a CPU has many events to be processed in a period where a carriage is moved to a reference white sheet to acquire data, and a load of the processing is large. Further, before reading the reference white sheet, black offset data serving as a reference for image data must be obtained. When processing, e.g., acquisition of black offset data or obtainment of reference white sheet data is inserted into a period where a CPU load is large, the processing may not be terminated within a specified time.

SUMMARY OF THE INVENTION

It is an object of the present invention to at least partially solve the problems in the conventional technology.

According to an aspect of the present invention, an image reader includes a reference white sheet that is provided at a position facing a scanning optical system movable in a sub-scanning direction on a downstream side of a document carrying direction by an automatic document feeding unit apart from a carried document reading glass provided in the middle of a document carrying path by the automatic document feeding unit, the reference white sheet is a substantially white member having a uniform concentration; a reading unit that moves the scanning optical system toward the reference white sheet to read the reference white sheet from a direction along which the scanning optical system returns to the carried document reading glass before reading one sheet of a document mounted on the carried document reading glass by the automatic document feeding unit in a sheet document reading mode of forming an image of the document carried by the automatic document feeding unit by an image sensor through the scanning optical system facing the carried document reading glass; and a shading correction unit that executes shading correction of eliminating irregularities in a light amount distribution in the scanning optical system based on image data obtained by reading the reference white sheet.

According to another aspect of the present invention, an image processor includes an image reader including a reference white sheet that is provided at a position facing a scanning optical system movable in a sub-scanning direction on a downstream side of a document carrying direction by an automatic document feeding unit apart from a carried document reading glass provided in the middle of a document carrying path by the automatic document feeding unit, the reference white sheet is a substantially white member having a uniform concentration; a reading unit that moves the scanning optical system toward the reference white sheet to read the reference white sheet from a direction along which the scanning optical system returns to the carried document reading glass before reading one sheet of a document mounted on the carried document reading glass by the automatic document feeding unit in a sheet document reading mode of forming an image of the document carried by the automatic document feeding unit by an image sensor through the scanning optical system facing the carried document reading glass; and a shading correction unit that executes shading correction of eliminating irregularities in a light amount distribution in the scanning optical system based on image data obtained by reading the reference white sheet; an image processor that executes image processing with respect to an image signal read by the image reader; and an image forming unit that forms an image according to the image data output from the image processor and outputs formed image.

According to still another aspect of the present invention, a computer program product having a computer-readable recording medium that stores therein a plurality of commands required to read an image, the commands causing a computer to execute moving a scanning optical system toward a reference white sheet that is provided at a position facing the scanning optical system on a downstream side of a document carrying direction by an automatic document feeding unit apart from a carried document reading glass and is a substantially white member having a uniform concentration, and reading the reference white sheet from a direction along which the scanning optical system returns to the carried document reading glass before reading one sheet of the document mounted on the carried document reading glass by the automatic document feeding unit in a sheet document reading mode where an image sensor forms an image of the document carried by the automatic document feeding unit through the scanning optical system that faces the carried document reading glass provided in the middle of a document carrying path and is movable in a sub-scanning direction; and executing shading correction of eliminating irregularities in a light amount distribution in the scanning optical system based on image data obtained by reading the reference white sheet.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying diagrams.

A first embodiment according to the present invention will now be explained with reference to FIGS. 1 to 15. The embodiment is an example of applying as an image reader a scanner device included in a digital copier that is an image processor.

Figure 1:
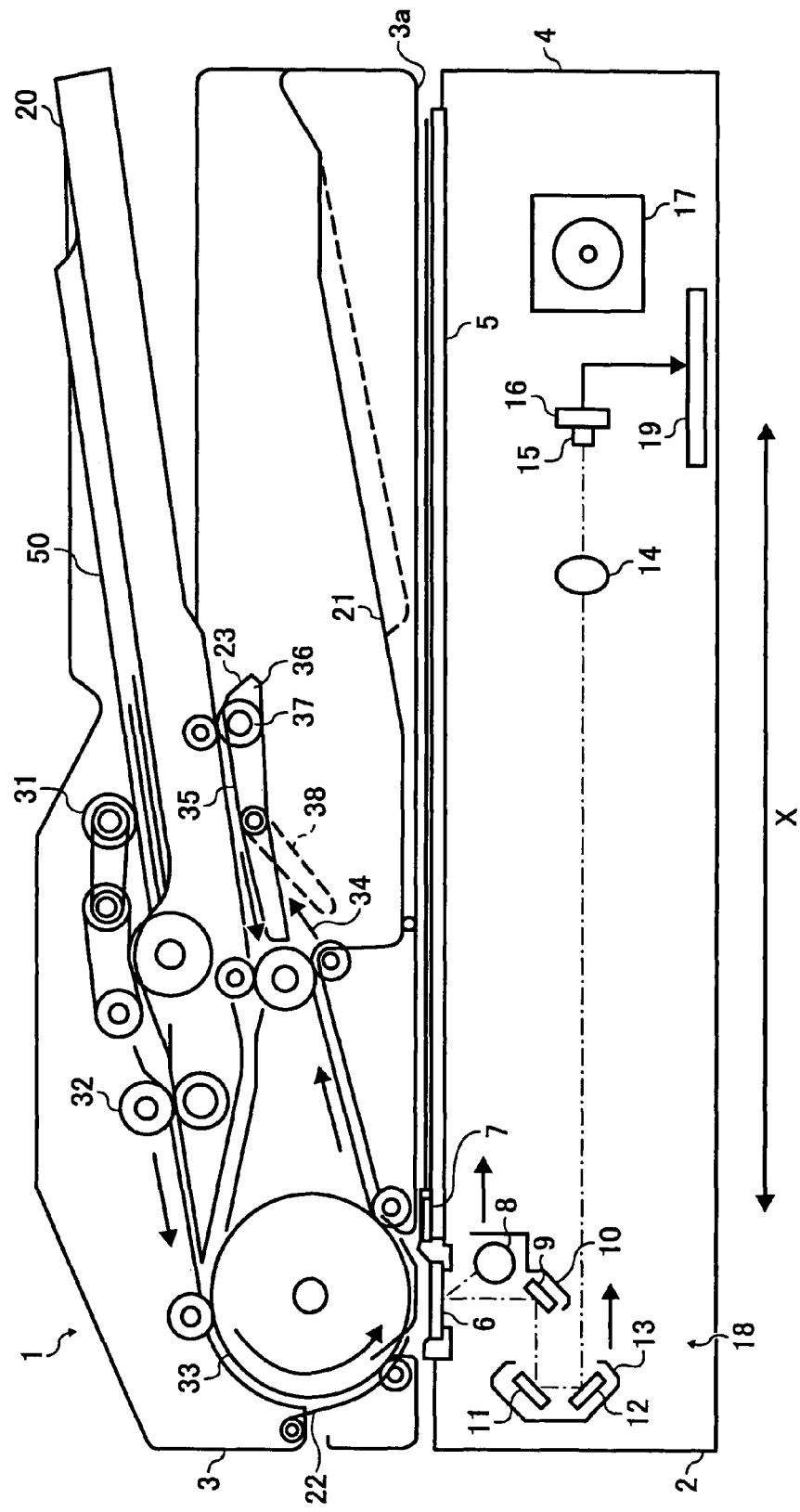
FIG. 1 is a side view of an internal structure of a scanner device according to a first embodiment of the present invention.

FIG. 1 is a schematic side view of an internal structure of a scanner device 1 according to the first embodiment of the present invention. The scanner device 1 includes a scanner main body 2 and a reversible automatic document feeder (RADF) 3 that is one type of automatic document feeder (ADF) as an automatic document feeding unit provided on the scanner main body 2. It is to be noted that a document pressing member 3a that is a white resin sheet is provided on a bottom of the RADF 3, and the document pressing member 3a also functions as a pressure plate.

The scanner main body 2 will be first explained. A document mounting glass 5 on which a document is mounted when reading a document image in a book document reading mode and an ADF document glass 6 as a carried document reading glass used when reading a document image in a sheet document reading mode are provided on an upper surface of a case 4 of the scanner main body 2.

The book document reading mode is an operation mode of reading an image of a document mounted on the document mounting glass 5. On the other hand, the sheet document reading mode is an operation mode of automatically feeding a document by the RADF 3 and reading an image of the document when the automatically fed document passes on the ADF document glass 6. It is to be noted that a main body operation panel (not shown) provided on an outer side of the case 4 can set such modes.

Further, a first carriage 10 including an illumination lamp (xenon lamp) 8 and a mirror 9 is arranged at a position facing the document mounting glass 5 from a lower side in the case 4 so as to be movable in a sub-scanning direction X along the document mounting glass 5. The illumination lamp 8 receives a driving voltage from a lamp stabilizer 8a (see FIG. 4) to be turned on, and irradiates a reading plane at a predetermined angle. A second carriage 13 including two mirrors 11 and 12 is arranged in a reflection optical path of the first carriage 10 so as to be movable in the sub-scanning direction X along the document mounting glass 5. A sensor board unit (SBU) 16 as a CCD driving unit having a color charge coupled device (CCD) 15 as a color image sensor mounted thereon is placed in a reflection optical path of the second carriage 13 via a lens 14.

Figure 2:
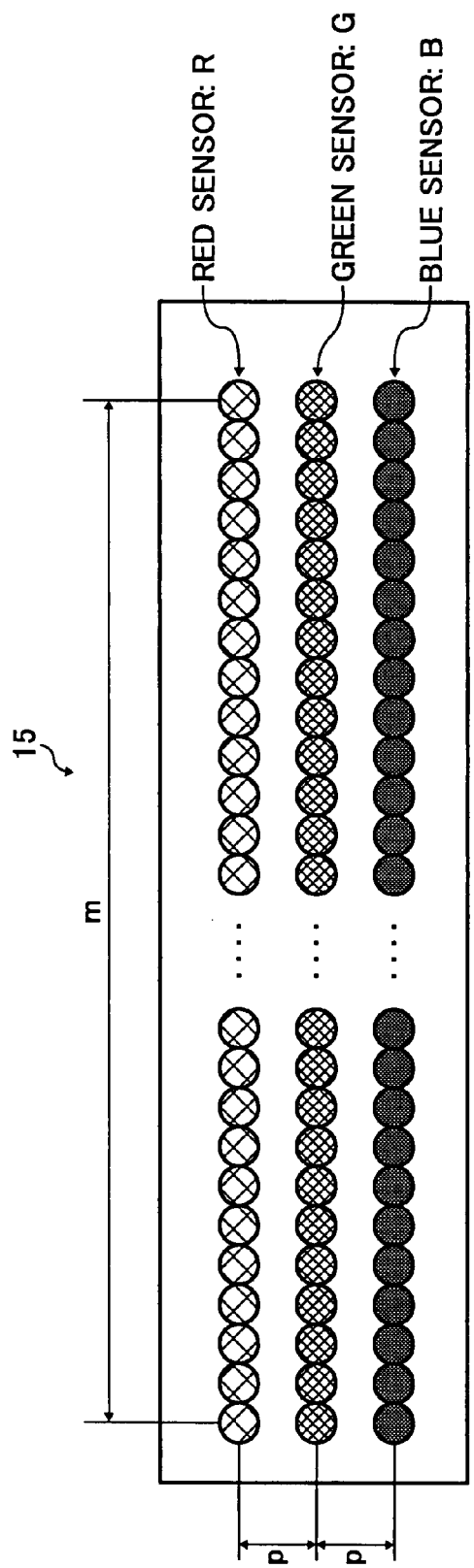
FIG. 2 is a schematic view of an example of a color CCD.

FIG. 2 is a schematic view of an example of the color CCD 15. The three-line color CCD 15 has a structure where three sensors are aligned and arranged in three rows through color filters of R, G, and B, and can fetch optical information obtained through color separation. In the example shown in FIG. 2, the respective sensors of R, G, and B are aligned at intervals of p.

The SBU 16 includes a clock driver, a timing signal generator, a signal processor, and others. The SBU 16 outputs a voltage according to an incident light amount, and supplies the output as image data to an image processor 19a (see FIG. 4) in a later-explained scanner control unit (SCU) 19.

Furthermore, a reference white sheet 7 is arranged on a surface of the case 4 facing the first carriage 10 between the document mounting glass 5 and the ADF document glass 6. The reference white sheet 7 is a substantially white member having a uniform concentration provided in a main scanning direction to obtain correction data in shading correction of eliminating irregularities in a lamp light amount distribution of the color CCD 15. The shading operation is set to perform shading every time the continuous reading operation is effected (data of the reference white sheet 7 is also collected every time each single sheet of the document is read) in the sheet document reading mode.

A scanner motor 17 as a stepping motor is coupled with the first carriage 10 and the second carriage 13 via a pulley or a wire (both of them are not shown), and it is movable in the same sub-scanning direction X at a velocity ratio of 2:1 from the left-hand side toward the right-hand side in FIG. 1. That is, the first carriage 10 and the second carriage 13 constitute a scanning optical system. When the two carriages 10 and 13 move in this manner, an image on a document 50 mounted on the document mounting glass 5 is read and scanned in the sub-scanning direction X by the color CCD 15, thereby constituting a document reading mechanism 18 here. An operation of reading and scanning a document (not shown) based on movement of the two carriages 10 and 13 in the document reading mechanism 18 is executed when the book document reading mode is set.

Moreover, a unit substrate, e.g., an SCU 19 constituting an electric system that controls an operation of the color image scanner 1 including the scanner main body 2 and the RADF 3 is built in an inner lower part of the case 4.

Figure 3:
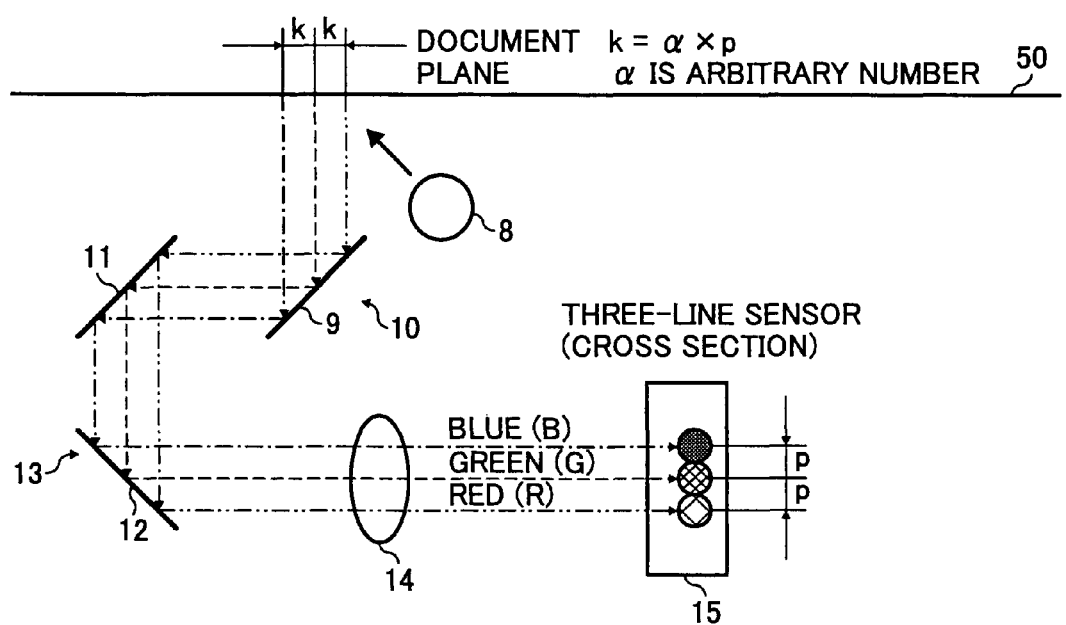
FIG. 3 is a schematic view of an optical path extending from a document plane to a three-line color CCD.

FIG. 3 is a schematic view of an optical path extending from a document plane to the three-line color CCD 15. As shown in FIG. 3, since the R, G, and B sensor rows are aligned at predetermined intervals, respective pieces of R, G, and B data acquired by the color CCD 15 at the same clock time are pieces of data obtained by reading different positions on the document 50. Each interval between the R, G, and B sensor rows is n, and data separated by a distance $k=\alpha \times p$ is read on the document. Here, $\alpha$ is an arbitrary number.

When the color CCD 15 fetches data upon movement of the carriages 10 and 13 toward the right-hand side in FIG. 3, the color CCD 15 reads arbitrary positions on the document plane in the order of R, G, and B. On the contrary, when the color CCD 15 fetches data upon movement of the carriages 10 and 13 toward the left-hand side, the color CCD 15 reads arbitrary positions on the document plane in the order of B, G, and R.

The RADF 3 used when the sheet document reading mode is set will now be explained. It is to be noted that, when such a sheet document reading mode is set, the first carriage 10 and the second carriage 13 are stopped below the ADF document glass 6, and this is determined as a home position. Then, the RADF 3 reads and scans an automatically fed document.

In the RADF 3 are provided a document base 20 that is used to mount the document 50 thereon when reading the document in the sheet document reading mode, a paper ejector 21 that ejects the read document 50, a document carrying path 22 communicating with the paper ejector 21 from the document base 20, and a reverser 23 that reverses the document 50 in a reversible reading mode. Here, the reversible reading mode is one of the sheet document reading modes, and it is an operation mode of reversing the document 50 to read and scan an image on a rear side after the RADF 3 automatically feeds the document 50 to read and scan an image on a front side of the document 50.

A document guide (not shown) that guides both side ends of the document 50 when carrying the mounted document 50 to the document carrying path 22 is provided on the document base 20. In the document base 20 are also provided a set sensor that detects whether the document is mounted on the document base 20 when reading the document 50 in the sheet document reading mode, a width size detection sensor that detects a size of the document mounted on the document base 20, a document length sensor, and a document rear end sensor that detects a rear end of the document (all of them are not shown). When these sensors can automatically specify a size of the document mounted on the document base 20 even if a size of the document is not specified by pressing a document specifying key or a numeric key.

A pickup roller 31 or a carriage roller 32 that separately feeds each sheet of the document mounted on the document base 20 is provided in the document carrying path 22 on the document base 20 side. The pickup roller 31 and the carriage roller 32 are driven by a paper feed motor (not shown). That is, when the paper feed motor drives the pickup roller 31 or the carriage roller 32 to rotate, each sheet of the document 50 mounted on the document base 20 is fed to the document carrying path 22.

A carriage drum 33 that carries the document 50 and also carries the document 50 to the paper ejector 21 is provided in the document carrying path 22. The ADF document glass 6 is placed below the carriage drum 33. A stepping motor (not shown) drives the carriage drum 33. Therefore, when the stepping motor drives the carriage drum 33 to rotate, the document 50 fed to the document carrying path 22 from the document base 20 is guided on the ADF document glass 6.

As a result, the pickup roller 31 feeds each sheet of the document 50 mounted on a document table 2a, and the carriage roller 32 or the carriage drum 33 carries each sheet of the document 50 to the ADF document glass 6 as a document reading position.

A reversing table 36 that forms a reversing path 35 and has one end communicating with a bifurcation point 34 diverging from the middle of the document carrying path 22 is provided in the reverser 23. A reversing roller 37 that is driven to rotate in a forward and a backward directions by a paper feed/reversing motor (not shown) is provided in the reversing table 36. A bifurcation claw 38 that can swivel with a support shaft as a swivel center is attached to the reversing path 35. When a swiveling operation of the support shaft allows the reversing path 35 to be opened/closed with respect to the document carrying path 22, the bifurcation claw 38 distributes the document 50 carried by the carriage drum 33 to one of the reverser 23 and the paper ejector 21. That is, when the reversible reading mode as one of the sheet document reading modes is set, the bifurcation claw 38 opens the reversing path 35 with respect to the document carrying path 22 by a swiveling operation of the support shaft to guide the document 50 carried by the carriage drum 33 to the reversing path 35. Then, the reversing roller 37 again carries the turned-over document 50 to the document carriage path 22.

It is to be noted that a flow of a paper feed and carriage operation of the document and a flow of a reversing operation of the document in various modes, e.g., the book document reading mode, the sheet document reading mode, the reversible reading mode as one of the sheet document reading modes, and others are known technologies, thereby omitting an explanation thereof.

A series of image reading operations of the document in the sheet document reading mode will now be simply explained. The carriage roller 32 or the carriage drum 33 feeds the document 50 set on the document base 20 to the ADF document glass 6 as a document reading position. Before starting reading the document, the illumination lamp 8 is turned on, and a reflector condenses light to irradiate a document plane. The light emitted from the illumination lamp 8 is reflected on the document 50, and enters the color CCD 15 via the three mirrors 10, 11, and 12 and the lens 14. Then, the document 50 is fed at a fixed velocity based on rotation of the carriage drum 33, thus effecting reading one document plane by the color CCD 15. The document 50 subjected to reading processing by the color CCD 15 is ejected to the paper ejector 21 based on rotation of the carriage drum 33. Subsequently, the sheets of the document 50 mounted on the document base 20 are sequentially read.

Figure 4:
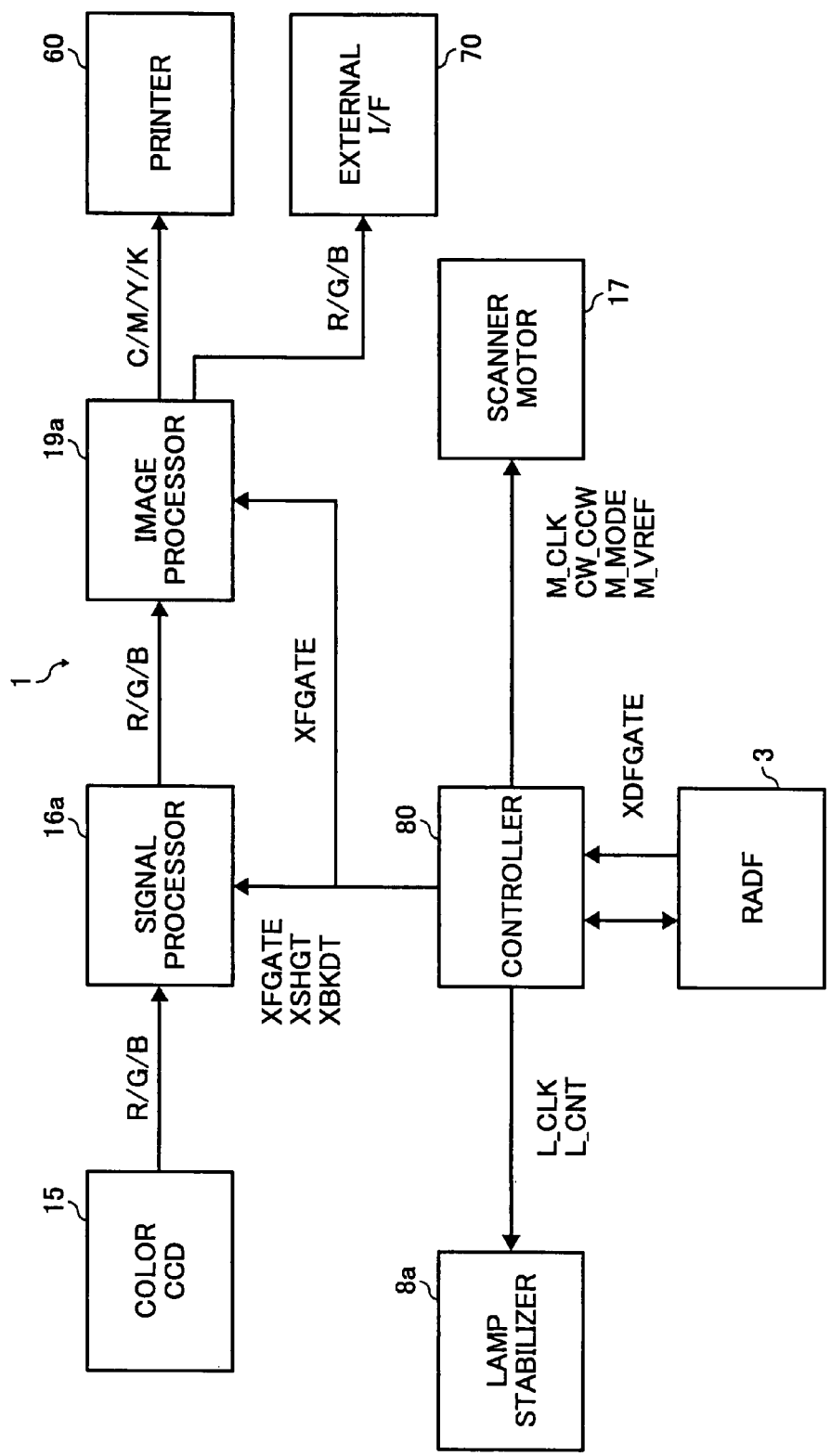
FIG. 4 is a block diagram of a structural example of an electric system in the scanner device.

The electric system in the scanner device 1 will now be explained. FIG. 4 is a block diagram of a structural example of the electric system of the scanner device 1. As shown in FIG. 4, a signal processor 16a in the SBU 16 converts reflection light from the document 50 (reference white sheet 7) having entered the color CCD 15 into a digital signal from an analog image signal. A digital image signal subjected to digital signal conversion is output to the image processor 19a in the SCU 19. Then, the image processor 19a performs various kinds of image processing, e.g., shading correction, gamma correction, or MTF correction, and thereafter the image-processed signal is transferred as image data to a printer 60 that is an image former or an external I/F 70, e.g., a memory. It is to be noted that, as shown in FIG. 3, the scanner device 1 includes a controller 80 that controls the entire scanner device 1. The controller 80 controls the scanner motor 17, the signal processor 16a that processes a CCD output signal, the image processor 19a, the lamp stabilizer 8a, and the RADF 3 in terms of an operation concerning the present invention.

Such a controller 80 includes a central processing unit (CPU)(not shown), a read only memory (ROM), a random access memory (RAM), and others. When the CPU operates while utilizing a work region in the RAM based on a program stored in the ROM, various kinds of processing are executed. It is to be noted that the program executed by the controller 80 may be a file having an installable format or an executable format, and may be recorded in a computer-readable recording medium, e.g., a CD-ROM, a flexible disk (FD), a CD-R, or a digital versatile disk (DVD) to be provided. In this case, when the CPU in the controller 80 reads the program from the storage medium and loads the program in a main storage device (not shown), various kinds of functions can be realized in the scanner device 1. The program may be stored in a computer connected with a network (not shown), e.g., Internet and downloaded through the network to be provided. Alternatively, the program may be provided or distributed through a network, e.g., Internet.

A control example of each unit by the controller 80 will now be explained. A control example of each unit by the controller 80 in the book document reading mode of driving the carriages 10 and 13 by the scanner motor 17 to read the reference white sheet 7 or the document 50 will be first explained. The controller 80 that controls the scanner motor 17 (sub-scanning timing) outputs signals (signals M_VREF0 to 2 that are used to set a motor current, signals M_MODE0 to 1 that are used to set an excitation mode of the motor, a signal CW_CCW that is used to specify a rotating direction, and a clock M_CLK that is used to drive the motor) to the scanner motor 17. Besides, the controller 80 outputs a signal XBKDT indicative of a black offset detection timing, a signal XSHGT indicative of a reference white sheet reading timing, and a signal XFGATE indicative of a document reading timing to the signal processor 16a, and further outputs a lighting synchronization clock L_CLK and a lighting signal L_CNT to the lamp stabilizer 8a.

On the other hand, in the sheet document reading mode, the carriages 10 and 13 read the reference white sheet 7 or the document 50 while reciprocating between the reference white sheet 7 and the ADF document glass 6 as a document reading position. In the sheet document reading mode, since the RADF 3 carries the document 50 and manages a timing, it outputs a signal XDFGATE indicative of a document reading timing to the controller 80. The controller 80 supplies the received signal as XFGATE to the signal processor 16a and the image processor 19a.

Figure 5:
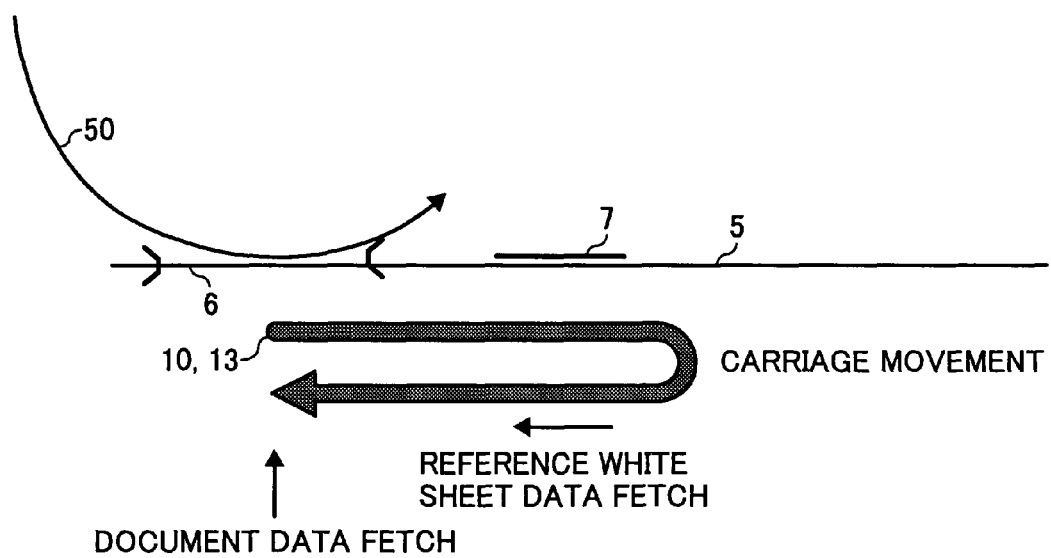
FIG. 5 is a schematic view of an operation in a sheet document reading mode.
Figure 6:
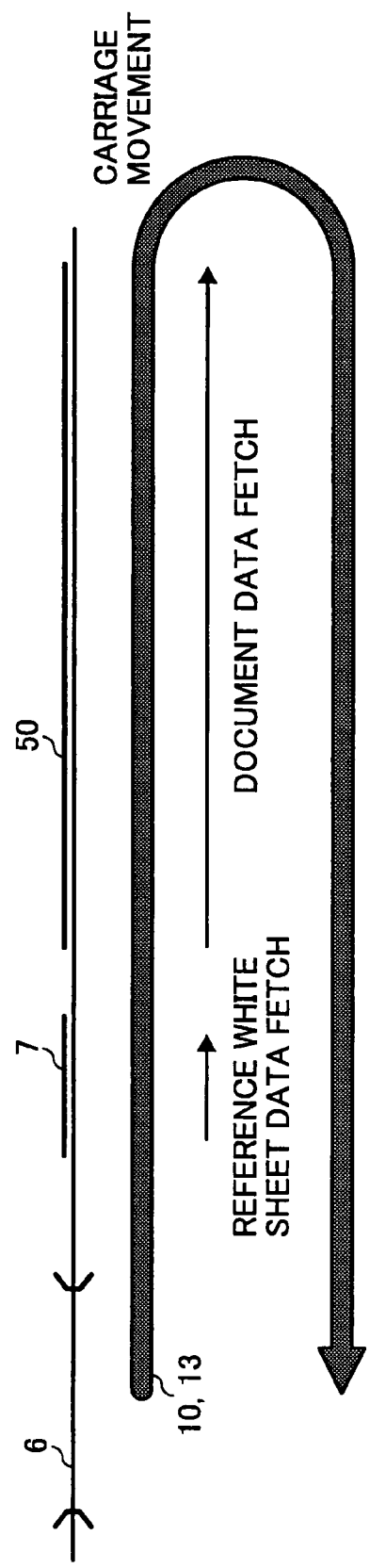
FIG. 6 is a schematic view of an operation in a book document reading mode.

The control example of each unit by the controller 80 as characteristics of the embodiment will now be explained. FIG. 5 is a schematic view of an operation in the sheet document reading mode, and FIG. 6 is a schematic view of an operation in the book document reading mode. It is to be noted that each bold line in FIGS. 5 and 6 indicates movements of the carriages 10 and 13.

In the sheet document reading mode, the scanner motor 17 moves the carriages 10 and 13 that stand by at the sheet document reading position (home position) in a direction of the reference white sheet 7 (forward direction) as shown in FIG. 5. A moving distance in this example is determined as a distance that can be read by the reference white sheet 7 at minimum. Then, the carriages 10 and 13 read the reference white sheet 7 while moving in a direction of the sheet document reading position (return direction), and move to and stop at the sheet document reading position (home position). Here, a reference white sheet reading unit is realized. After stop, the document 50 carried by the RADF 3 passes on the ADF document glass 6 as the document reading position when a predetermined time elapses, and the optical technique is used to read information in the document 50 while this passage.

On the other hand, in the book document reading mode, the scanner motor 17 moves the carriages 10 and 13 that stand by at the sheet document reading position (home position) in the direction of the reference white sheet 7 as shown in FIG. 6 to perform reading in the order of the reference white sheet 7 and the document 50. A velocity of the carriages 10 and 13 is gradually increased after start of movement. A target velocity is reached at the time of start of reading the document at the latest, and the carriages 10 and 13 are driven based on a profile of reading the document 50 at a fixed velocity. When reading the document 50 is finished, the velocity is reduced, and the carriages 10 and 13 are stopped. The carriages 10 and 13 are then moved in an opposite direction, and stopped at the sheet document reading position (home position). As compared with FIG. 5, the movement direction of the carriages 10 and 13 when reading the reference white sheet 7 is opposite.

As a result, in the sheet document reading mode, black offset data serving as a reference for image data must be acquired before reading the reference white sheet 7, but a time until acquisition of a white level can be sufficiently assured after obtaining a black level in the present invention. Consequently, acquisition of the black offset data can be executed in a limited sheet-to-sheet time, and the sheet-to-sheet time can be reduced as compared with that in a conventional mode, thus improving productivity.

In a measure for an improvement in productivity in a conventional technology, the carriages are slowly moved at the time of return, and hence the fact that a movement velocity that compensates the slow movement is required in forward movement is clear. Therefore, requirement of a high-torque motor that enables high-speed driving increases a cost, but a velocity in movement is not biased in the present invention, thus suppressing a cost.

According to the embodiment, when reading data in the sheet document reading mode and the book document reading mode, document data and reference white sheet data as a plurality of types of color-separated image information are acquired in the same order. This point will now be explained in detail hereinafter.

Figure 7:
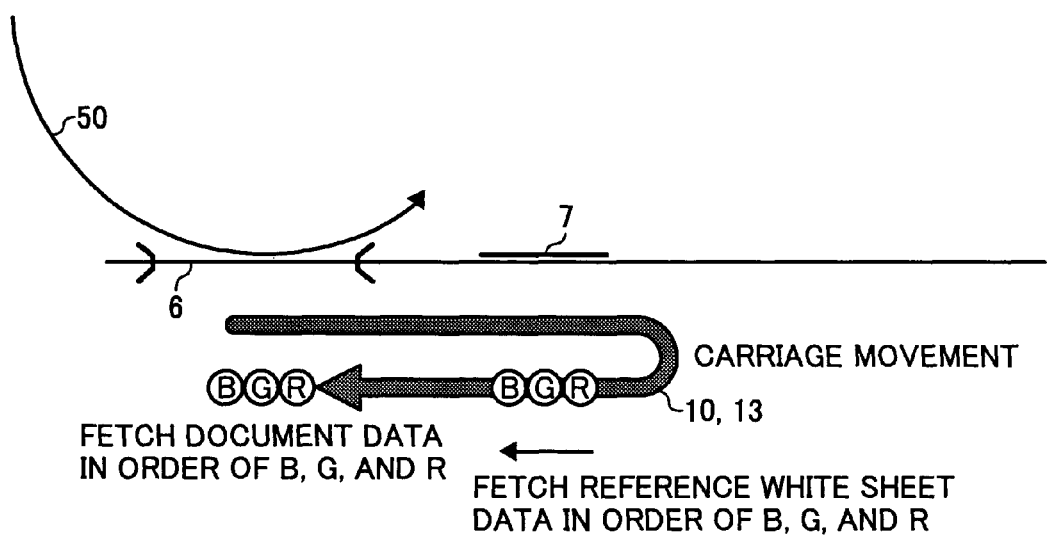
FIG. 7 is a schematic view of an operation in the sheet document reading mode.
Figure 8:
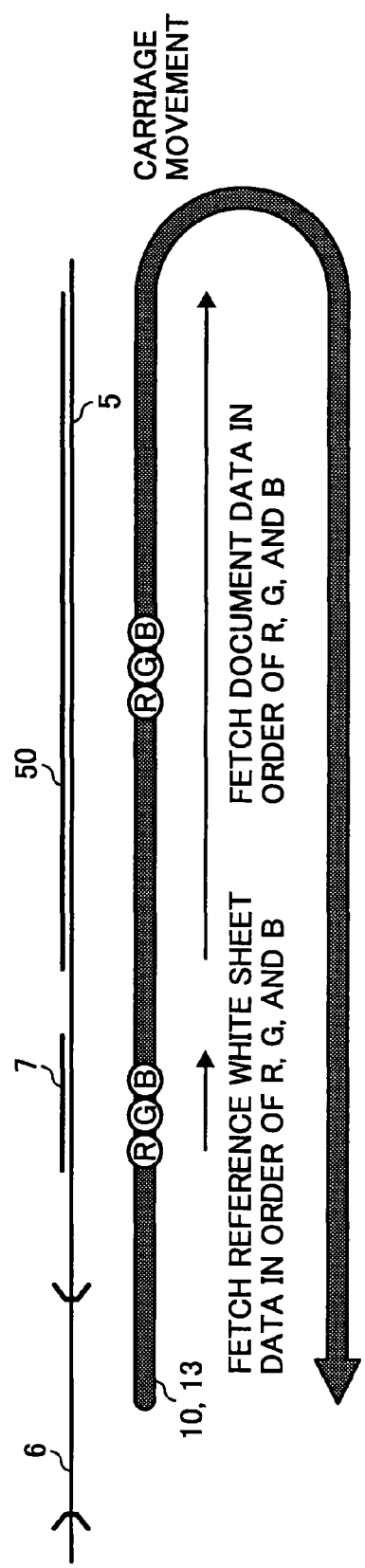
FIG. 8 is a schematic view of an operation in the book document reading mode.

FIG. 7 is a schematic view of an operation in the sheet document reading mode, and FIG. 8 is a schematic view of an operation in the book document reading mode. It is to be noted that each bold line in FIGS. 7 and 8 indicates movement of the carriages 10 and 13.

As shown in FIG. 5, in the sheet document reading mode, the carriages 10 and 13 that stand by at the sheet document reading position (home position) move to a position where the reference white sheet 7 can be read, and then read the reference white sheet 7 while moving in the direction of the sheet document reading position (home position). Further, the carriages 10 and 13 move to and stop at the sheet document reading position. After stop, since the document 50 carried by the RADF 3 passes on the ADF document glass 6 as the document reading position, the color CCD 15 reads information of this document. In such a case, as shown in FIG. 7, it can be understood that the order of data read by the three-line color CCD 15 is the reading order "BGR" in both the reference white sheet 7 and the document 50 (see FIG. 3).

On the other hand, as shown in FIG. 6, in the book document reading mode, the scanner motor 17 moves the carriages 10 and 13 that stand by at the sheet document reading position (home position) in a direction of the reference white sheet 7, thereby reading the reference white sheet 7 and the document 50 in this order. Upon completion of reading the document 50, the carriages 10 and 13 reduce a velocity and stop. Then, the carriages 10 and 13 move in an opposite direction and stop at the sheet document reading position (home position). In such a case, as shown in FIG. 8, it can be understood that the order of data fetched by the three-like color CCD 15 is the reading order of "RGB" in both the reference white sheet 7 and the document 50 (see FIG. 3).

As a result, when reading the reference white sheet 7, color signals (RGB) are acquired in the same order as that when reading document data. Therefore, an operation of changing alignment of white sheet data to that of document data does not have to be carried out every time, thus reducing a load on the CPU. Therefore, further speed-up can be realized.

Figure 9:
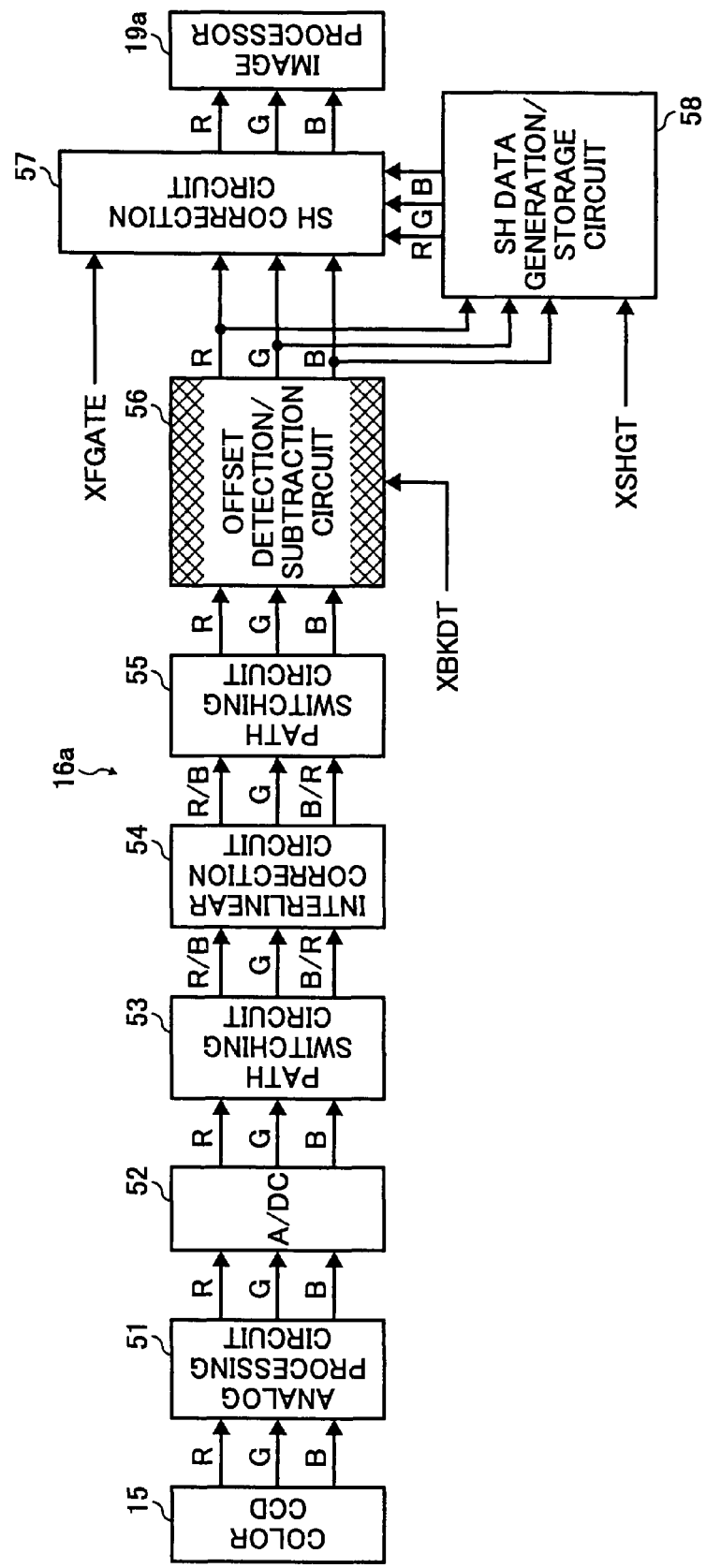
FIG. 9 is a block diagram of a structure of a signal processor.

The signal processor 16a that processes a CCD output signal will now be explained. FIG. 9 is a block diagram of a structure of the signal processor 16a. Three-color output signals R, G, and B output from the three-like color CCD 15 are input to an analog processing circuit 51. The analog processing circuit 51 performs sampling/holding, amplification, reproduction of a direct-current offset, and others with respect to the CCD signals, and an A/DC 52 converts the CCD signals into digital signals. Thereafter the digital signals are input to a shading correction circuit (SH correction circuit) 57 and a shading data generation/storage circuit (SH data generation/storage circuit) 58 via a path switching circuit 53, an interlinear correction circuit 54, a path switching circuit 55, and an offset detection/subtraction circuit 56.

The offset detection/subtraction circuit 56 as an offset subtracter detects an offset component (hereinafter "black offset") included in image data, and subtracts the detected black offset from the image data. Reference white sheet read data must be also input to the shading data generation/storage circuit 58 after black offset subtraction. Therefore, in the sheet document reading mode, after reading the preceding document is finished, the black offset must be determined before reading the reference white sheet 7. The controller 80 inputs a signal XBKDT as a sub-scanning period where this processing is executed to the offset detection/subtraction circuit 56. The offset detection/subtraction circuit 56 executes, e.g., averaging processing based on a plurality of pieces of OPB pixel data in the CCD in an XBKDT signal effective period, thereby detecting the black offset for each of R, G, and B.

The offset detection/subtraction circuit 56 subtracts the detected offset component from each read data, and outputs data including no black offset to a rear stage.

The shading data generation/storage circuit 58 and the shading correction circuit 57 function as a shading correction unit and are well known. The shading data generation/storage circuit 58 performs statistical processing (e.g., simple averaging or weighted averaging) for each sensor in the main scanning direction in an effective period of a signal indicative of a period where the reference white sheet 7 should be fetched, i.e., a signal XSHGT, and stores a data level of the reference white sheet 7 in a memory. The shading correction circuit 57 subjects the document read data input thereto according to a signal XFGATE indicative of a document reading period and the shading data stored in the shading data generation/storage circuit 58 to an arithmetic operation to correct a data distortion in the main scanning direction.

The path switching circuits 53 and 55 and the interlinear correction circuit 54 will now be explained. As explained above with reference to FIG. 2, since the R, G, and B sensor rows are aligned at predetermined intervals p in the three-line color CCD 15, respective pieces of R, G, and B data acquired by the color CCD 15 at the same clock time is data obtained by reading different positions on the document. Conversely, precedently obtained data must be delayed and matched with subsequently obtained data to acquire data at the same position. The path switching circuits 53 and 55 and the interlinear correction circuit 54 perform these operations.

Figure 10:
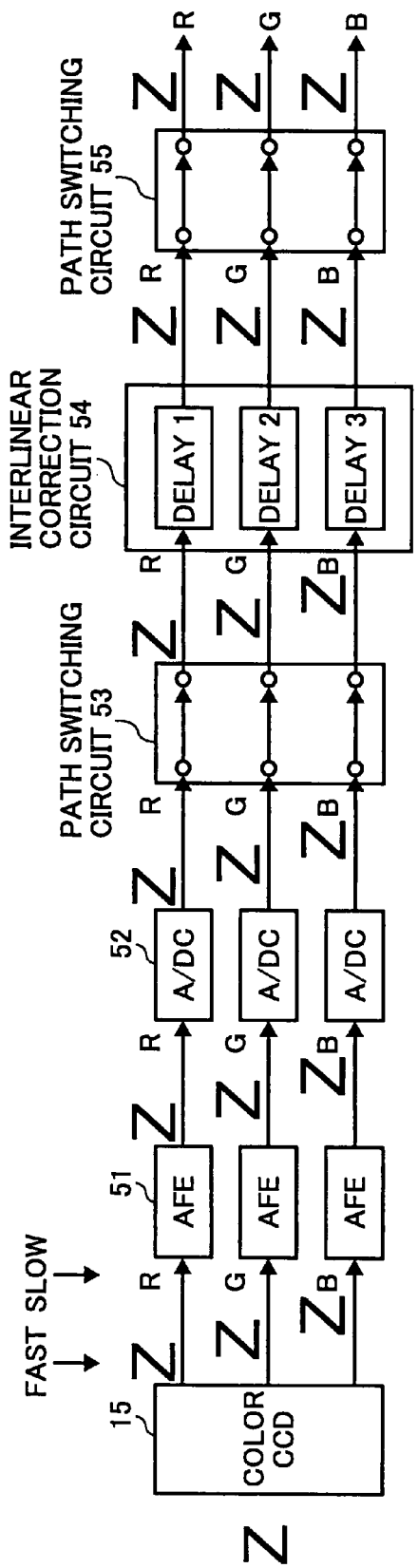
FIG. 10 is a schematic view of a path switching example.

FIG. 10 is a schematic view of a path switching example. FIG. 10 is a view of an example where the color CCD 15 outputs respective pieces of data at the same position in the order of R, G, and B, and each of R, G, and B is determined to have a differential delay corresponding to four lines on an image. The interlinear correction circuit 54 as an interlinear correction unit includes three delay circuits, and each of these circuits delays each input data by a predetermined amount and outputs the delayed data. The delay amount is settable. A delay circuit D1 sets delay of eight lines (four lines+four lines), a delay circuit D2 sets delay of four lines, and a delay circuit D3 sets delay of zero line. The path switching circuits 53 and 55 as path switching units are provided on a front and rear stages of the interlinear correction circuit 54. The front path switching circuit 53 can switch a path to be connected with a delay circuit corresponding to an amount of delaying each piece of the R, G and B data. The rear path switching circuit 55 connects the path to restore an original path condition in such a manner that the delayed RGB data series does not remain in a counterchanged state. According to the embodiment, since the color CCD 15 outputs data in the order of R, G, and B in the book document reading mode, this corresponds to the relationship shown in FIG. 10.

Figure 11:
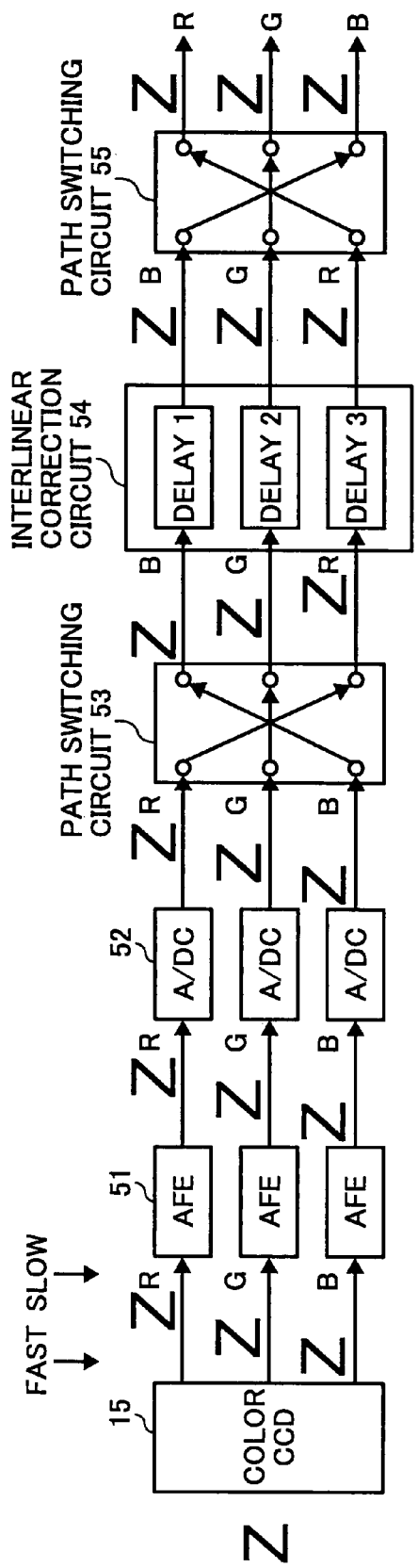
FIG. 11 is a schematic view of another path switching example.

FIG. 11 is a schematic view of another path switching example. FIG. 11 is a view of an example where the color CCD 15 outputs respective pieces of data at the same position in the order of B, G, and R. Each of B, G, and R is determined to have a differential delay corresponding to four lines on an image. The interlinear correction circuit 54 is the same as that shown in FIG. 10, the delay circuit D1 sets delay of eight lines, the delay circuit D2 sets delay of four lines, and the delay circuit D3 sets delay of zero line. This FIG. 11 is a view of the example where the path switching circuits 53 and 55 are in a cross state to input a B data series that should be delayed for eight lines to the delay circuit D1 and a B data series that is delayed for zero line to the delay circuit D3. The rear path switching circuit 55 is connected in the cross state so that the delayed RGB data series is returned to the original path. According to the embodiment, the sheet document reading mode corresponds to this example.

Figure 12:
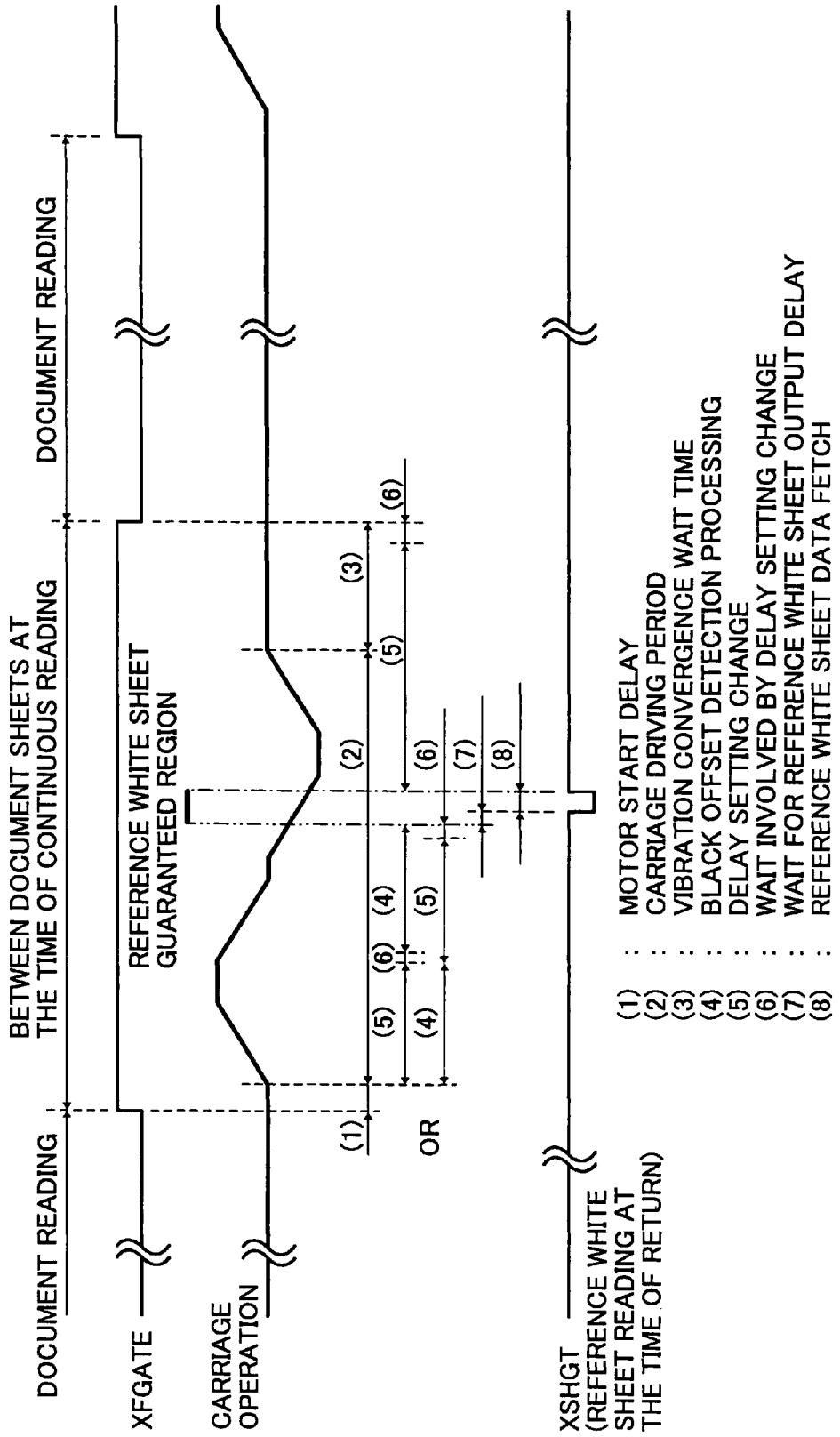
FIG. 12 is a timing chart of continuous reading in the sheet document reading mode.
Figure 13:
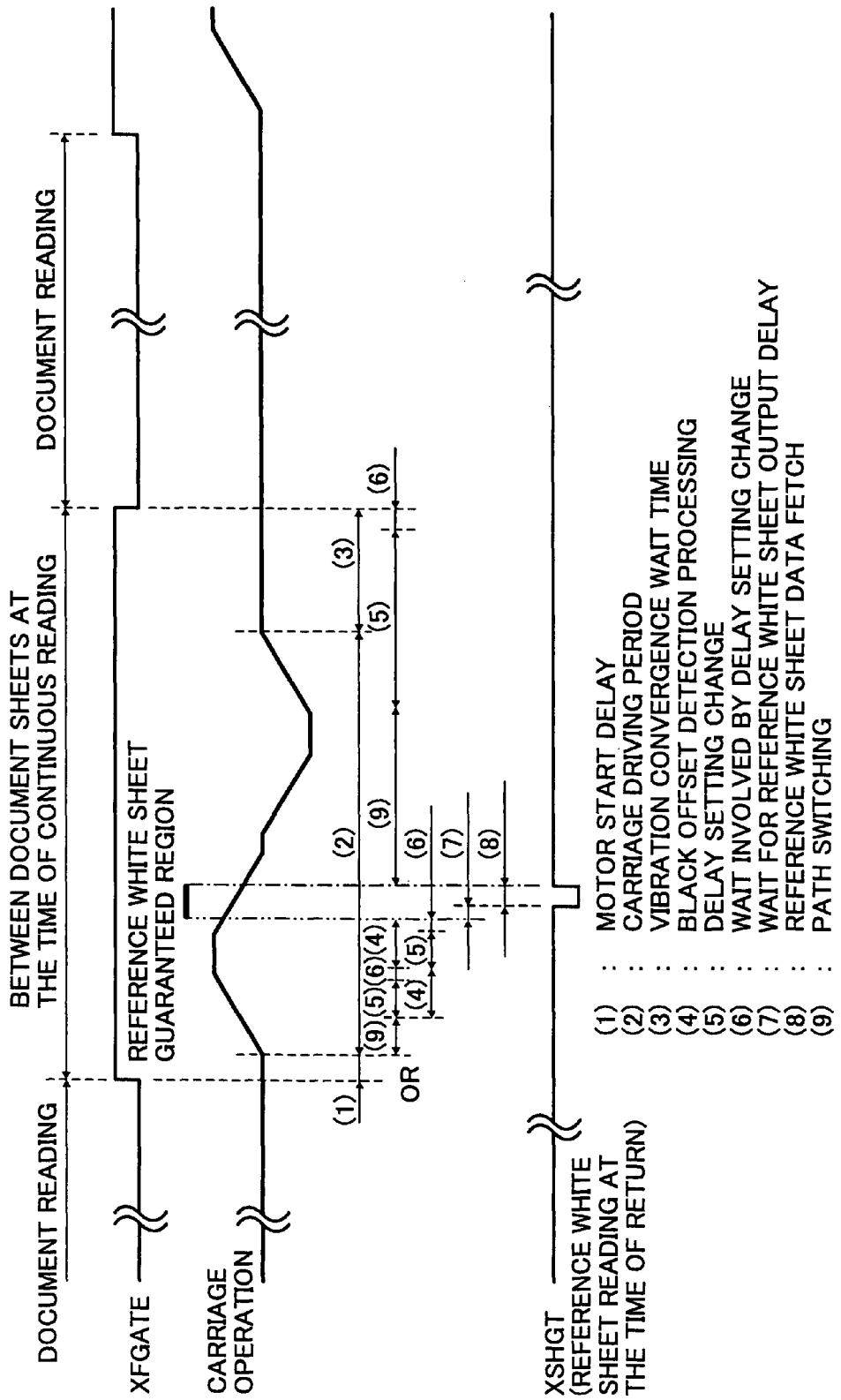
FIG. 13 is a timing chart of continuous reading in a conventional sheet document reading mode.

FIG. 12 is a view of a timing of reading an nth document sheet to reading an (n+1)th document sheet at the time of continuous reading in the sheet document reading mode in the scanner device 1.

According to the embodiment, the path switching circuits 53 and 55 are set at the beginning of continuous reading alone. FIG. 12 is a view of the timing in the middle of continuous reading in the sheet document reading mode, and hence a timing of path switching is not shown. However, path switching may be carried out any time if later-explained black offset detection and delay amount setting can be reflected in time. In terms of a control sequence, effecting path switching and then performing a continuous reading operation is good.

According to a conventional technology, since reference white sheet reading is performed during movement of the carriages in the forward direction, output orders are opposite to the CCD data output order of R, G, and B and the document read data output order of B, G, and R. Therefore, the path switching circuits must be set as shown in FIG. 10 before reference white sheet reading, and the path switching circuits must be set as shown in FIG. 11 before document reading. That is, according to the conventional technology, since reference white sheet data is read during movement of the carriages in the forward direction, path switching must be effected during continuous reading, which increases a load on the CPU.

Various kinds of operations will now be briefly explained.

A black offset detection processing operation will be first explained. A black offset must be subtracted from reference white sheet read data, and then a resultant data must be input to the shading data generation/storage circuit 58. Therefore, black offset detection is performed before reference white sheet reading.

Delay amount changing by the delay circuit will now be explained.

1. A width of the reference white sheet 7 must be decreased to reduce a size of the scanner device 1, and arranging the wide reference white sheet 7 is difficult. Therefore, thoroughly reading limited data of the reference white sheet 7 is one factor that realizes a high picture image. A reference white sheet fetching signal XSGHT from the controller 80 defines a fetching timing of the reference white sheet 7, and the signal is common to R, G, and B signals of three colors. Therefore, data input to the shading data generation/storage circuit 58 in a period where the reference white sheet fetching signal XSHGT is enabled must be data read from the reference white sheet with respect to all of R, G, and B.

2. In the scanner device 1, the RADF 3 does not always carry the document 50 at a fixed velocity in the sheet document reading mode, but a document carriage velocity varies based on a reading magnification. For example, assuming that a carriage velocity in reading in the same size is 100 mm/s, the document 50 is moved at 200 mm/s that is double the former velocity to reduce fetching target data (in the sub-scanning direction) to half when the document 50 should be reduced to 50% in size and read. In reading the document, a movement velocity that is dependent on a reading magnification is realized in this manner. On the other hand, in regard to a velocity of moving the carriages 10 and 13 in reference white sheet reading, the carriages 10 and 13 are moved at a maximum velocity as long as the reference white sheet 7 can be read without fail (the velocity is fixed irrespective of a magnification).

3. As can be understood from the assumptions 1 and 2, the carriage movement velocity when reading the reference white sheet 7 may not match with the carriage movement velocity when reading the document 50. In this case, a delay amount set in the interlinear correction circuit 54 must be set to a value according to each of these velocities. Therefore, as shown in FIG. 12, set values according to reference white sheet reading and document reading are set before the respective reading operations.

When a interlinear correction delay amount is changed under conditions optimum for each of reference white sheet reading and document reading in this manner, a maximum number of reading lines can be assured in reading the reference white sheet 7, and interlinear correction according to a magnification can be executed in reading the document 50. Therefore, the highly productive scanner device 1 with less deterioration in image quality can be obtained.

A wait involved by changing a delay amount of each delay circuit will now be explained. Data subjected to delay amount changing and then input to each delay circuit is not output unless it waits for a set delay amount.

A reference white sheet output delay wait will now be explained. After reading the reference white sheet 7, data waits for a delay amount in the interlinear correction circuit 54.

Reference white sheet data fetch will now be explained. Data input to the shading data generation/storage circuit 58 is subjected to statistical processing to generate shading data.

Figure 14:
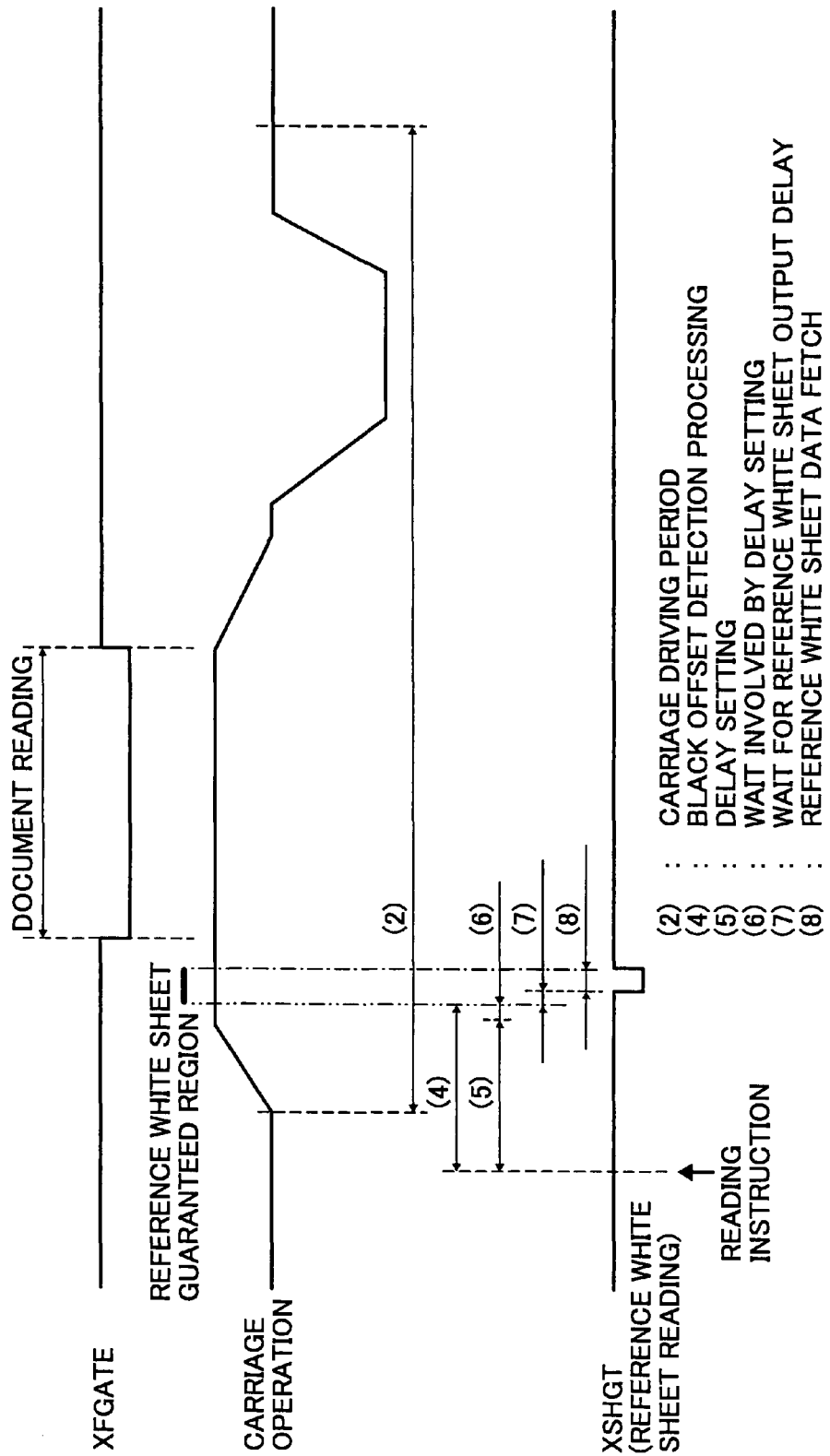
FIG. 14 is a timing chart of reading in the book document reading mode.

On the other hand, the following control is executed in the book document reading mode. FIG. 14 is a view of a reading timing in the book document reading mode in the scanner device 1. Upon issuing a reading start instruction of the scanner device 1 (e.g., an instruction from a non-shown operation panel by a user or a reading start command from a device connected with a digital copier), black offset detection processing and delay setting change processing are performed in parallel (they may be performed in serial if they have a margin for time). The reference white sheet 7 is read and then the document is read while moving the carriages 10 and 13. In the book document reading mode, reference white sheet reading and document reading are carried out with a common delay amount setting according to a reading magnification in this manner. That is, in the book document reading mode, an interlinear correction delay amount is not changed.

Figure 15A:
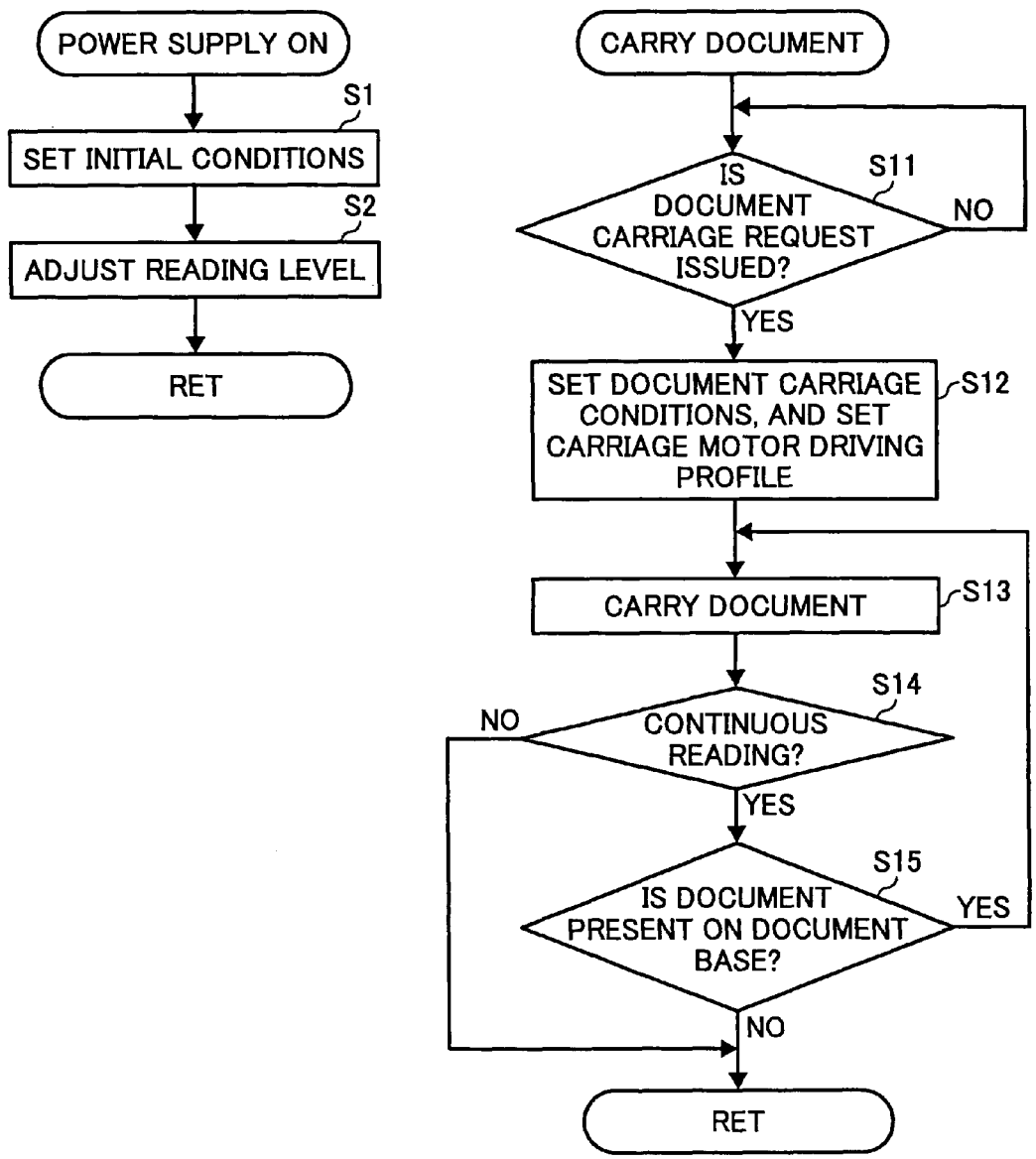
FIG. 15 is a flowchart of a flow of various processing operations by a controller.
Figure 15B:
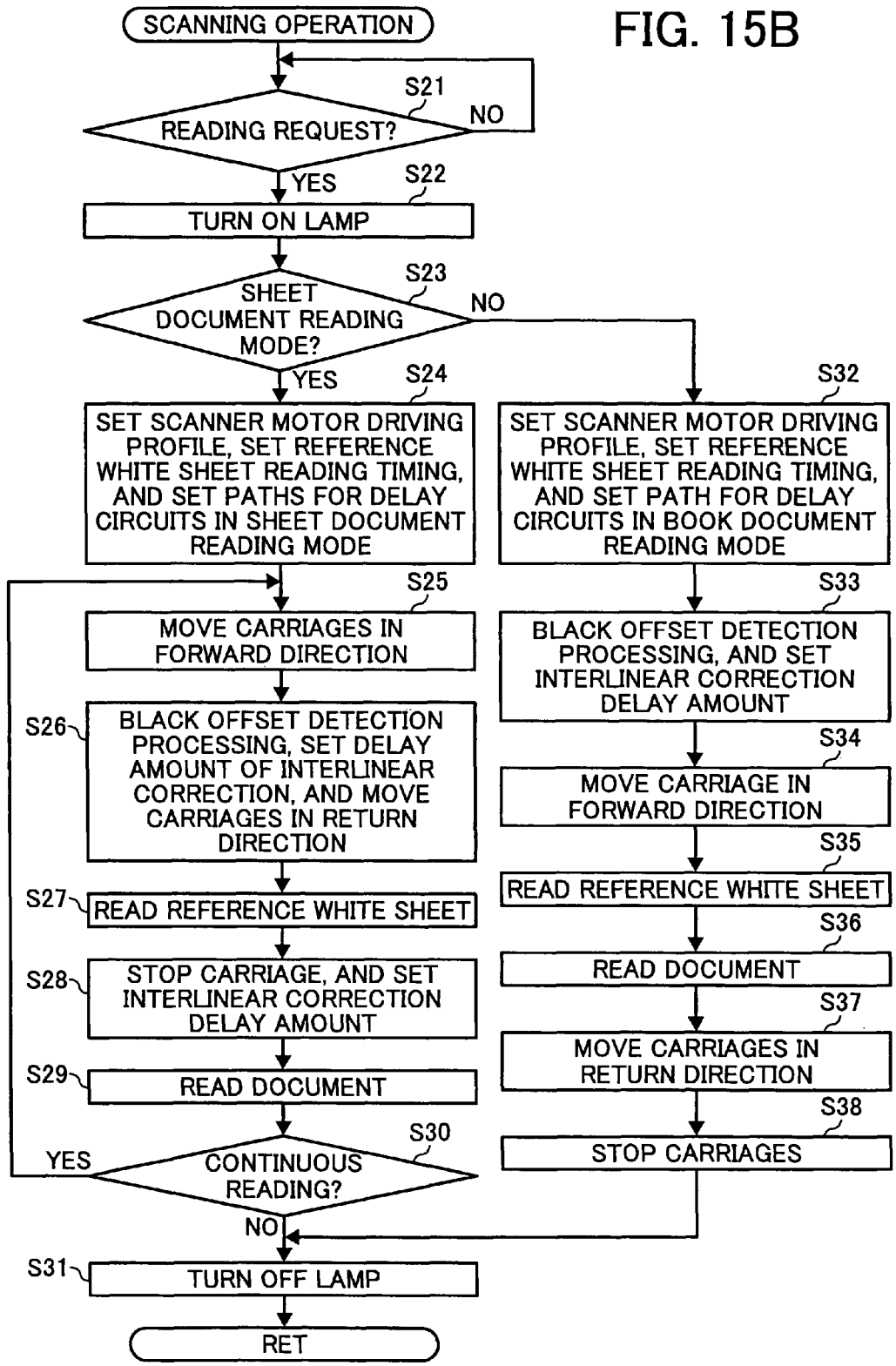

FIG. 15 is a flowchart of a flow of various kinds of processing operations by the controller 80.

In a power supply ON module, operating conditions (one main scanning clock number, a processing clock frequency, a black offset set value, and others) of the scanner device 1 are set (a step S1), and a gain of a gain amplifier included in the analog processing circuit 51 of the signal processor 16a is determined (a step S2).

In a document carriage module, when a document carriage request is issued (Yes at a step S11), profile data of the scanner motor 17 according to a necessary document carriage velocity is set (a step S12), and the document 50 is carried (a step S13). In continuous reading (Yes at a step S14), presence/absence of the document 50 on the document base 20 of the RADF 3 is checked. When the document 50 is present on the document base 20 of the RADF 3 (Yes at a step S15), the next document 50 is carried (the step S13).

In a scan operation module, after a reading request (Yes at a step S21), illumination lamp 8 is turned on (a step S22).

Further, when the sheet document reading mode is selected (Yes at a step S23), reading conditions in the sheet document reading mode (setting a profile according to driving by the scanner motor 17, setting a reading (XSHGT) timing for the reference white sheet 7, and setting paths of the delay circuits) are carried out (a step S24). Then, the carriages 10 and 13 are moved in the forward direction (a step S25), black offset detection processing and a delay amount of interlinear correction are set, and the carriages 10 and 13 are moved in a return direction after movement for a predetermined distance (a step S26). The reference white sheet 7 is read during a returning operation (a step S27). When the carriages 10 and 13 return to the sheet document reading position, the carriages 10 and 13 are stopped, an interlinear correction delay amount is set (a step S28), and the document 50 to be carried is read (a step S29). In continuous reading (Yes at a step S30), the processing from movement of the carriages to reading the document (the steps S25 to S29) is again executed. When continuous reading is not selected (No at the step S30), illumination lamp 8 is turned off (a step S31), and the continuous reading operation is terminated.

On the other hand, when the book document reading mode is selected (No at the step S23), the reading conditions in the book document reading mode (setting a profile according to driving by the scanner motor, setting a reading (XSHGT) timing for the reference white sheet, and setting paths of the delay circuits) are carried out (a step S32), and then black offset detection processing and interlinear correction delay amount setting processing are performed (a step S33). Then, the carriages 10 and 13 are moved in the forward direction (a step S34) to read the reference white sheet 7 and the document 50 (steps S35 and S36). When reading the document 50 is finished, the carriages 10 and 13 are moved in the return direction (a step S37), and the carriages 10 and 13 are stop at the sheet document reading position (a step S38). Illumination lamp 8 is turned off (a step S31) to terminate the reading operation.

According to the embodiment, before one sheet of the document 50 carried on the carried ADF document glass 6 by the RADF 3 in the sheet document reading mode, the carriages 10 and 13 are moved toward the reference white sheet 7 side to read the reference white sheet 7 from a direction along which the carriages 10 and 13 return to the carried ADF document glass 6 side. As a result, in the sheet document reading mode, black offset data serving as a reference for image data must be acquired before reading the reference white sheet 7. However, a time after acquisition of a black level and before obtainment of a white level can be sufficiently assured. As a result, the black offset data can be acquired within a limited sheet-to-sheet time, and the sheet-to-sheet time can be reduced as compared with that in a conventional mode, thus improving productivity. Furthermore, since a velocity in movement is not biased, a cost can be suppressed. That is, at the time of shading correction in the sheet document reading mode, productivity in continuous reading can be improved while assuring an image quality.

A second embodiment according to the present invention will now be explained with reference to FIGS. 16 and 17. It is to be noted that like reference numerals denote parts equal to those in the first embodiment, thereby omitting an explanation thereof.

Figure 16:
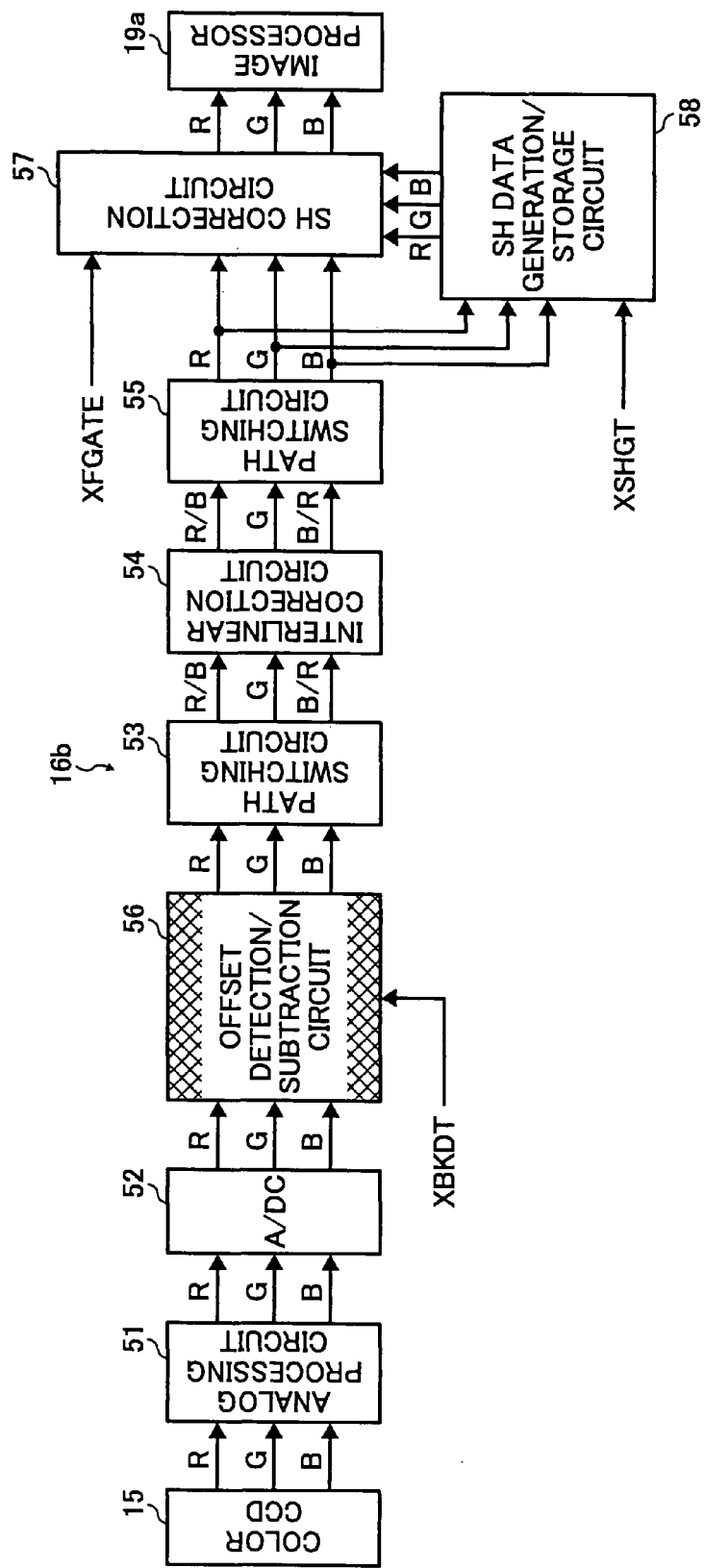
FIG. 16 is a block diagram of a structure of a signal processor according to a second embodiment of the present invention.

FIG. 16 is a block diagram of a structure of a signal processor 16a according to the second embodiment of the present invention. A structure of the signal processor 16a shown in FIG. 16 is different from that of the signal processor 16a according to the first embodiment in that an offset detection/subtraction circuit 56 is arranged on an upstream side apart from path switching circuits 53 and 55 and an interlinear correction circuit 54.

In the FIG. 9 circuit configuration according to the first embodiment, the offset detection/subtraction circuit 56 is arranged on a downstream side apart from the path switching circuits 53 and 55 and the interlinear correction circuit 54. Therefore, when a path is switched during a black offset detection period (XBKDT effective period), color data of an unintended series is mixed in an obtained black offset, and a correct black offset cannot be acquired. That is, path switching and black offset detection cannot be processed in parallel, and they must be executed in serial.

On the other hand, in a circuit configuration shown in FIG. 16, since the offset detection/subtraction circuit 56 is arranged on the upstream side apart from the path switching circuits 53 and 55 and the interlinear correction circuit 54, path switching and black offset detection can be processed in parallel. This is a very advantageous configuration in an example where processing is executed within a limited time. As a result, since the black offset processing can be executed before performing the interlinear correction, the black offset processing can be executed without being affected by the interlinear correction operation performed on the downstream side. Therefore, the black offset detection processing and the delay setting can be executed in parallel without a need of execution in serial, and a sheet-to-sheet time can be thereby reduced to improve productivity.

Figure 17:
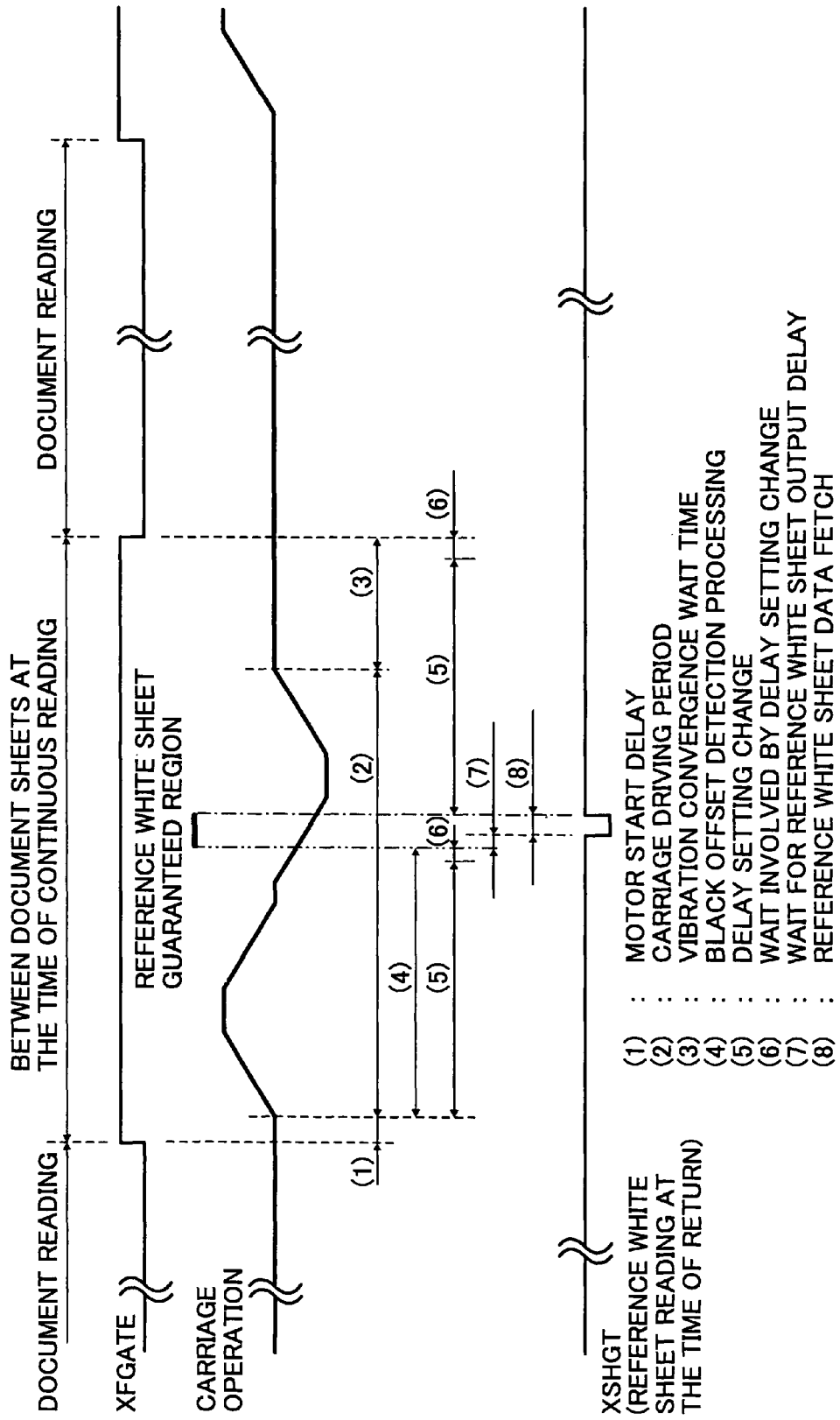
FIG. 17 is a timing chart of continuous reading in a sheet document reading mode.
Figure 18:
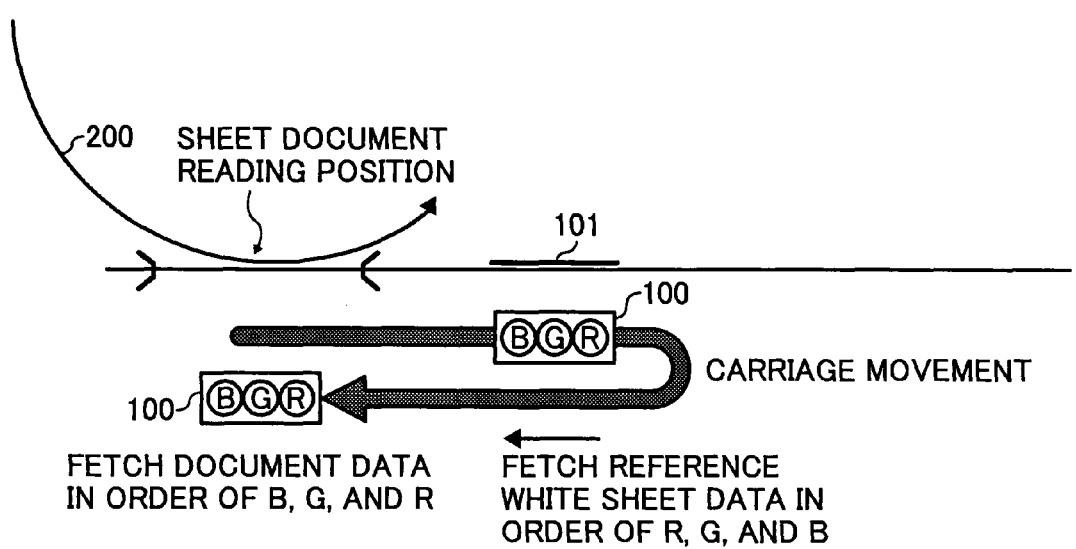
FIG. 18 is a schematic view of an operation when a color CCD fetches an image in a continuous reading operation by a conventional image reader.

FIG. 17 is a view of a timing from reading an nth sheet of the document to reading an (n+1)th sheet of the document at the time of continuous reading in the sheet document reading mode in the scanner device 1.

According to the embodiment, since the scanner device 1 has the signal processor 16a including the offset detection/subtraction circuit 56 arranged on the upstream side apart from the path switching circuits 53 and 55 and the interlinear correction circuit 54, path switching and black offset detection can be executed in parallel (in FIG. 17, black offset detection and delay setting change are shown in parallel). It is to be noted that these operations may be processed in serial if a margin for time is given.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image reader comprising:
a reference white sheet, the reference white sheet being a substantially white member having a uniform concentration, the reference white sheet being provided under an automatic document feeding unit, the automatic document feeding unit being configured to move a docu- ment in a document carrying path, the reference white sheet being arranged, with respect to a carried document reading glass, downstream in a document carrying direction, the carried document reading glass being provided adjacent to the document carrying path;

a reading unit configured to move a scanning optical system across the reference white sheet to read the reference white sheet from a direction along which the scanning optical system returns to the carried document reading glass before reading one sheet of a document mounted on the carried document reading glass by the automatic document feeding unit in a sheet document reading mode, the scanning optical system being configured to face the carried document reading glass while reading the one sheet, the sheet reading mode includes forming an image of the document carried by the automatic document feeding unit by using an image sensor which is configured to receive light from the scanning optical system facing the carried document reading glass; and a shading correction unit that executes shading correction of eliminating irregularities in a light amount distribution in the scanning optical system based on image data obtained by reading the reference white sheet, wherein the image sensor is a plurality of color image sensors configured to sense color and the plurality of color image sensors are arranged at preset intervals and in the sheet reading mode the plurality of color image sensors acquire image data corresponding to their respective color, and in the sheet document reading mode, the shading correction unit executes the shading correction based on information obtained by moving the scanning optical system across the reference white sheet towards the carried document reading glass so that an order of data read by the plurality of color image sensors while the scanning optical system moves across the reference white sheet is the same as an order of data read by the plurality of color image sensors when the document is being read.

2. The image reader according to claim 1, having a book document reading mode of reading an image on a document mounted on a document mounting glass provided at a position facing the scanning optical system on a downstream side in a document carrying direction apart from the carried document reading glass and the reference white sheet while moving the scanning optical system in a sub-scanning direction, wherein the reading unit moves the scanning optical system toward the reference white sheet and the document mounting glass to sequentially read the reference white sheet and the document mounted on the document mounting glass in the book document reading mode.

3. The image reader according to claim 1, wherein the image sensor is a color image sensor that outputs image data separated into a plurality of types of colors.

4. The image reader according to claim 3, further comprising:

an interlinear correction unit that configured to delay the image data for each color output from the color image sensor by an amount to perform interlinear correction; and a path switching unit that configured to switch a path with respect to the interlinear correction unit before and after the interlinear correction, wherein when continuously reading a plurality of sheets of the document in the sheet document reading mode, setting by the path switching unit is performed prior to continuous reading, and the setting by the path switching unit is fixed irrespective of reading the reference white sheet and reading the document.

5. The image reader according to claim 4, comprising:

a subtracting unit that is arranged on a front stage of the path switching unit and the interlinear correction unit, the subtracting unit being configured to detect a black offset component included in the image data and subtract detected black offset signal component from the image data.

6. The image reader according to claim 4, wherein a carriage velocity of the document by the automatic document feeding unit is varied according to a reading magnification and a movement velocity of the scanning optical system when reading the reference white sheet is set to a preset velocity irrespective of the reading magnification in the sheet document reading mode, and the interlinear correction unit sets a fixed value as a delay amount of interlinear correction prior to reading the reference white sheet, and sets a delay amount according to a magnification prior to reading the document.

7. The image reader according to claim 4, wherein the reference white sheet is read and the document is read based on a common delay amount setting according to a reading magnification in the book document reading mode.

8. An image processor comprising:

an image reader including a reference white sheet, the reference white sheet being a substantially white member having a uniform concentration, the reference white sheet being configured to face a scanning optical system, the scanning optical system being movable in a sub-scanning direction, the reference white sheet being provided under a document feeder, the document feeder being configured to move a document in a document carrying path, the reference white sheet being arranged, with respect to a carried document reading glass, down stream in a document carrying direction, the carried document reading glass being provided adjacent to the document carrying path, and a reading unit configured to move the scanning optical system across the reference white sheet to read the reference white sheet from a direction along which the scanning optical system returns to the carried document reading glass before reading one sheet of a document mounted on the carried document reading glass by the automatic document feeding unit in a sheet document reading mode, the scanning optical system being configured to face the carried document reading glass, the sheet reading mode including forming an image of the document carried by the automatic document feeding unit by using an image sensor which is configured to receive light from the scanning optical system facing the carried document reading glass;

a shading correction unit that executes shading correction of eliminating irregularities in a light amount distribution in the scanning optical system based on image data obtained by reading the reference white sheet;

an image processor that executes image processing with respect to an image signal read by the image reader; and an image forming unit that forms an image according to the image data output from the image processor and outputs formed image, wherein the image sensor is a plurality of color image sensors configured to sense color and the plurality of color image sensors are arranged at preset intervals and in the sheet reading mode the plurality of color image sensors acquire image data corresponding to their respective color, and in the sheet document reading mode, the shading correction unit executes the shading correction based on information obtained by moving the scanning optical system across the reference white sheet towards the carried document reading glass so that an order of data read by the plurality of color image sensors while the scanning optical system moves across the reference white sheet is the same as an order of data read by the plurality of color image sensors when the document is being read.

9. The image processor according to claim 8, having a book document reading mode of reading an image on a document mounted on a document mounting glass provided at a position facing the scanning optical system on a downstream side in a document carrying direction apart from the carried document reading glass and the reference white sheet while moving the scanning optical system in a sub-scanning direction, wherein the reading unit moves the scanning optical system across the reference white sheet and the document mounting glass to sequentially read the reference white sheet and the document mounted on the document mounting glass in the book document reading mode.

10. The image processor according to claim 8, wherein the image sensor is a color image sensor that outputs image data separated into a plurality of types of colors.

11. The image processor according to claim 10, further comprising:

an interlinear correction unit configured to delay the image data for each color output from the color image sensor by a preset amount to perform interlinear correction; and a path switching unit that configured to switch a path with respect to the interlinear correction unit before and after the interlinear correction, wherein when continuously reading a plurality of sheets of the document in the sheet document reading mode, setting by the path switching unit is performed prior to continuous reading, and the setting by the path switching unit is fixed irrespective of reading the reference white sheet and reading the document.

12. The image processor according to claim 11, comprising:

a subtracting unit that is arranged on a front stage of the path switching unit and the interlinear correction unit, the substracting unit being configured to detect a black offset component included in the image data and subtract a detected black offset signal component from the image data.

13. The image processor according to claim 11, wherein a carriage velocity of the document by the automatic document feeding unit is varied according to a reading magnification and a movement velocity of the scanning optical system when reading the reference white sheet is set to a preset velocity irrespective of the reading magnification in the sheet document reading mode, and the interlinear correction unit is configured to set a fixed value as a delay amount of interlinear correction prior to reading the reference white sheet, and to set a delay amount according to a magnification prior to reading the document.

14. The image processor according to claim 11, wherein the reference white sheet is read and the document is read based on a common delay amount setting according to a reading magnification in the book document reading mode.

15. A computer program product having a non-transitory computer-readable recording medium that stores therein a plurality of commands required to read an image, the commands causing a computer to execute:

moving a scanning optical system across a reference white sheet that is provided at a position facing the scanning optical system, the reference white sheet being provided under a document feeder, the document feeder being configured to move a document in a document carrying path, the scanning optical system being moved in an upstream direction with respect to the document carrying path and towards a carried document reading glass;

reading the reference white sheet as the scanning optical system is moved across the reference white sheet;

reading one sheet of the document mounted on the carried document reading glass by the automatic document feeding unit in a sheet document reading mode after the reference white sheet is read, where an image sensor forms an image of the document carried by the automatic document feeding unit through the scanning optical system that faces the carried document reading glass, the carried document reading glass being provided adjacent to the document carrying path, the scanning optical system being movable in a sub-scanning direction, and the white sheet is arranged, with respect to the carried document reading glass, downstream in a document carrying direction; and executing shading correction of eliminating irregularities in a light amount distribution in the scanning optical system based on image data obtained by reading the reference white sheet, wherein the image sensor is a plurality of color image sensors configured to sense color and the plurality of color image sensors are arranged at preset intervals and in the sheet reading mode the plurality of color image sensors acquire image data corresponding to their respective color, and in the sheet document reading mode, the shading correction unit executes the shading correction based on information obtained by moving the scanning optical system across the reference white sheet towards the carried document reading glass so that an order of data read by the plurality of color image sensors while the scanning optical system moves across the reference white sheet is the same as an order of data read by the plurality of color image sensors when the document is being read.

16. The computer program product according to claim 15, wherein the commands further cause the computer to execute a book document reading mode of reading an image of the document mounted on a document mounting glass provided at a position facing the scanning optical system on the downstream side of the document carrying direction apart from the carried document reading glass and the reference white sheet while moving the scanning optical system in the sub-scanning direction, and the scanning optical system is moved toward the reference white sheet and the document mounting glass to sequentially read the reference white sheet and the document mounted on the document mounting glass in the book document reading mode.

17. The computer program product according to claim 15, wherein the commands further cause the computer to execute:

performing, prior to continuous reading, setting by a path switching unit that switches a path with respect to an interlinear correction unit at the front or the rear of the interlinear correction unit that delays the image data for each color output from the image sensor by a predetermined amount to effect interlinear correction, and fixing the setting by the path switching unit irrespective of reading the reference white sheet and reading the document when continuously reading a plurality of sheets of the document in the sheet document reading mode.

18. The computer program product according to claim 17, wherein the commands further cause the computer to execute:

varying a carriage velocity of the document by the automatic document feeding unit according to a reading magnification and setting a movement velocity of the scanning optical system when reading the reference white sheet to a predetermined velocity irrespective of the reading magnification in the sheet document reading mode; and allowing the interlinear correction unit to set a fixed value as a delay amount of interlinear correction prior to reading the reference white sheet and set a delay amount according to a magnification prior to reading the document.

19. The computer program product according to claim 17, wherein the commands further cause the computer to execute:

reading the reference white sheet and reading the document based on a common delay amount setting according to a reading magnification in the book document reading mode.

* * * * *